United States Patent
Dietzsch et al.

(10) Patent No.: US 8,810,906 B2
(45) Date of Patent: Aug. 19, 2014

(54) ILLUMINATION DEVICE FOR A MICROSCOPE

(75) Inventors: Leander Dietzsch, Jena (DE); Christian Boeker, Gleichen (DE); Andreas Nolte, Rosdorf/Mengershausen (DE); Thomas Belkner, Goettingen (DE); Michael Wagener, Gleichen (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 576 days.

(21) Appl. No.: 12/934,119

(22) PCT Filed: Mar. 24, 2009

(86) PCT No.: PCT/EP2009/002133
§ 371 (c)(1),
(2), (4) Date: Sep. 23, 2010

(87) PCT Pub. No.: WO2009/118146
PCT Pub. Date: Oct. 1, 2009

(65) Prior Publication Data
US 2011/0019272 A1     Jan. 27, 2011

(30) Foreign Application Priority Data
Mar. 26, 2008   (DE) .......................... 10 2008 015 720

(51) Int. Cl.
*G02B 21/00* (2006.01)
*G02B 21/06* (2006.01)
(52) U.S. Cl.
CPC ............ *G02B 21/0032* (2013.01); *G02B 21/06* (2013.01); *G02B 21/00* (2013.01)
USPC ............................. 359/381; 359/368; 359/385

(58) Field of Classification Search
CPC ..... G02B 21/00; G02B 21/0032; G02B 21/06
USPC .......................................... 359/368–390, 821
See application file for complete search history.

(56) References Cited

U.S. PATENT DOCUMENTS

| 2,977,848 A | 4/1961 | Malfeld | |
|---|---|---|---|
| 7,440,183 B2* | 10/2008 | Bender | 359/381 |
| 2006/0012860 A1* | 1/2006 | Bender | 359/381 |

(Continued)

FOREIGN PATENT DOCUMENTS

| DE | 101 20 424 A1 | 11/2002 |
|---|---|---|
| DE | 103 14 125 A1 | 10/2004 |

(Continued)

OTHER PUBLICATIONS

"International Search Report", International Application No. PCT/EP2009/002133, Completion Date Jun. 9, 2009, 6 pages.

*Primary Examiner* — Thong Nguyen
(74) *Attorney, Agent, or Firm* — Hoffman Warnick LLC

(57) ABSTRACT

The invention relates to an illuminating device for a microscope with an illumination magazine comprising a plurality of light emitting units. A mechanical illuminator changer can change the light emitting unit currently active in the operative position. A filter magazine having a plurality of filter units is present, wherein a mechanical filter changer for changing the filter unit currently in the active operative position is associated with the filter magazine. At least one mechanical coupling component is provided for cooperation with the filter changer and the illuminator and for uniquely assigning each filter unit to a specific light emitting unit.

20 Claims, 5 Drawing Sheets

(56) References Cited

U.S. PATENT DOCUMENTS

| | | |
|---|---|---|
| 2007/0041091 A1 | 2/2007 | Takeuchi |
| 2007/0091939 A1* | 4/2007 | Yoshikawa et al. ............... 372/2 |
| 2007/0139954 A1* | 6/2007 | Sander .......................... 362/575 |
| 2007/0236785 A1* | 10/2007 | Matsumoto .................... 359/381 |
| 2008/0043324 A1* | 2/2008 | Lytle et al. .................... 359/388 |

FOREIGN PATENT DOCUMENTS

| | | |
|---|---|---|
| DE | 11 2004 000 340 T5 | 1/2006 |
| DE | 10 2005 054 184 A1 | 5/2007 |
| DE | 10 2007 007 797 A1 | 8/2008 |
| DE | 10 2007 007 798 A1 | 8/2008 |
| EP | 0 321 586 A1 | 6/1989 |

\* cited by examiner

ILLUMINATION DEVICE FOR A MICROSCOPE

FIELD OF THE INVENTION

The invention relates to an illuminating device for a microscope comprising an illuminator magazine having a plurality of light emitting units and comprising a mechanical illuminator changer for changing the light emitting unit currently in the active operative position.

RELATED ART

The publication DE 103 14 125 B4 discloses such an illuminating device comprising a system for illuminating objects with different wavelengths of light in microscopes, automatic microscopes, and devices for fluorescence microscopy applications.

Furthermore, the publication DE 10 2005 054 184 A1 discloses a multispectral illuminating device having a plurality of semiconductor radiation sources, each of which emits optical radiation in a different emission wavelength range. The semiconductor radiation sources are accommodated in a immovable magazine. Furthermore, a color splitter is assigned to each semiconductor radiation source in such a way that the optical radiation emitted by each of said semiconductor radiation sources is coupled into a common illuminating beam path. To this end, the color splitters are fixed to the semiconductor radiation sources and together therewith constitute a multi-bandpass filter.

These prior devices suffer from the drawback that they require a large amount of room for installation, since the light emitting units, which in this case are light emitting diodes, must be disposed adjacent to the associated optics. Furthermore, coupling of the light into the optical path leading to the object to be illuminated requires color splitters in the form of precisely adapted multi-bandpass filters. Even though it is possible, according to the publication DE 103 14 125 B4, to change the wavelength by revolving a turret magazine, this publication does not solve the problem of assigning the emission spectra of the narrow-band light emitting diodes uniquely to a different fluorescence filter unit in the beam path of the microscope.

SUMMARY OF THE INVENTION

The object of the invention may be regarded as being the provision of a device for a microscope providing a simple and economical changing mechanism for synchronously replacing a light emitting unit active in the operative position and its matching filter inset also active in the operative position by a further combination of light emitting unit and filter inset of a plurality of such combinations.

According to the invention, an illuminating device is provided for a microscope, which device comprises an illuminator magazine having a plurality of light emitting units. A mechanical illuminator changer is capable of changing the light emitting unit currently active in the operative position. A filter magazine with a plurality of filter units is provided, wherein a mechanical filter changer for changing the filter unit active in the operative position is assigned to the filter magazine. There is at least one mechanical coupling means present which cooperates with the filter changer and the illuminator changer and uniquely assigns a light emitting unit to each filter unit.

This illuminating device has the advantage of providing the user with a changing mechanism in the form of the filter changer and the illuminator changer that excludes the occurrence of errors in the selection of the combination of associated light emitting units and filter units. Once this association has been set in the illuminating device, it is possible to select a new combination of light emitting unit and filter unit in a sure, error-free, and expedient manner merely by actuating one of the components of the changing mechanism, e.g., merely by setting the coupling means or one of the magazines to one of the possible combinations.

The device of the invention is advantageously designed for mechanical, non-motorized systems, in which a cost advantage is achieved by refraining from the use of electric components. Nevertheless, the invention has the advantage that it can be motorized at any time, all that is required being a single motor for driving the coupling means or for driving one of the magazines, it being possible to set the corresponding combination of light emitting unit and filter unit automatically with, say, a single stepping motor.

In a preferred embodiment of the invention, the filter magazine and/or the illuminator magazine has linearly or circularly arranged filter units or light emitting units, respectively. In spite of the different kinematic conditions involved in coupling linearly extending magazines and/or circularly configured magazines, in all of these cases the coupling means of the invention is advantageously capable of assigning a light emitting unit uniquely to each filter unit, as the following figures show.

Further provision is made for the filter magazine and/or the illuminator magazine to be in the form of a turret magazine, at least in the form of a filter changer and/or an illuminator changer. Turret magazines are characterized in that they are revolvable about a rotation axis, the coupling means of the invention being adapted to kinematically coordinate rotary movements in a simple and economical, mechanical manner. In a simple embodiment of the invention, the illuminator changer is thus a toothed belt wheel or a gear wheel that cooperates with the illuminator magazine. Similarly, the filter changer is a toothed belt wheel or a gear wheel that cooperates with the filter magazine. Hence the coupling means consists of a toothed belt or a coupling gear wheel that engages said toothed belt wheels or said gear wheels, respectively.

Further provision is made for the filter magazine and/or the illuminator magazine to have a slidable magazine, at least as a filter changer and/or as an illuminator changer. Such linearly configured magazines are also capable, according to the present invention, of cooperating in such a way that each filter unit of a linear slidable magazine can be assigned uniquely to a light emitting unit of a linearly slidable magazine.

Furthermore, a switching equipment is provided for placing the illuminator magazine to in an active or passive mode. For example, such switching equipment advantageously enables the user also to use a multi-bandpass filter in conjunction with a further light source, since the switching equipment is capable of coupling said other light source optionally also with a multi-bandpass filter into the optical path of the illuminating device of the invention. Hence, by switching the illuminator magazine from the active to the passive mode, the switching equipment can advantageously switch over to this additional light source and/or the additional multi-bandpass filter, even when the illuminating module and filter module are retained active in the operative position.

To this end, it is preferred for an optical coupling element to be present in the optical path between the filter magazine and the illuminator magazine. When necessary, the switching element can be removed from the optical path so that the filter magazine and the illuminator magazine are still mechanically coupled, but a further light source and/or an additional multi-bandpass filter can then be inserted into the hitherto existing optical path. Hence another light emitting source can be coupled into the optical path by pivoting, lowering, turning or removing the optical coupling element from the optical path between the filter magazine and the illuminator magazine.

In a preferred embodiment of the invention, the filter changer and/or the illuminator changer have a rotatable or slidable mirror cascade composed of cascade mirrors. The advantage of this is that a plurality of non-rotatable and/or non-slidable and thus immovable filter magazines and/or illuminator magazines can be employed as a filter magazine and/or an illuminator magazine, it being sufficient to displace the associated mirror cascade mechanically in order to change the filter unit and/or the light emitting unit. An additional advantage of this is that the construction of a filter magazine and of an illuminator magazine can be simplified, since these elements need not simultaneously assume the function of a filter changer or of an illuminator changer, this function now being assumed by the mirror cascade.

The filter magazine preferably has rigidly mounted filter units or rigidly mounted light emitting units. In this case the filter units can be firmly encapsulated in the filter magazine and/or the light emitting units can be firmly encapsulated in the illuminator magazine, thus providing complete filter magazines and/or illuminator magazines for interchanging or initially equipping the illuminating device. Furthermore, interchangeable filter modules and/or interchangeable light emitting modules can, instead of being rigidly mounted units, be provided in the filter magazine or in the illumination magazine, respectively. The advantage of this is that individual combinations of filter units and light emitting units can be interchanged in the magazines, thus increasing the versatility of the device of the invention.

At least one light emitting diode or at least one laser diode can be used as the light source in a light emitting unit. If necessary, a light emitting unit can have a plurality of light emitting diodes or laser diodes, in order to increase the light intensity in an advantageous manner. On the other hand, it is equally possible to use at least one optical fiber instead of light emitting diodes or laser diodes. The optical fiber has the advantage of being a mechanically flexible light source that can be bent to assume certain positions in an illuminator magazine. In this case it is advantageous to provide a separate illuminator changer, preferably in the form of the aforementioned mirror cascade, rather than to configure the illuminator magazine itself as an illuminator changer revolvable about an axis. For the purpose of increasing the light intensity of an optical fiber, a bundle of optical fibers can be provided in a single light emitting unit.

In another preferred embodiment of the invention, a mechanical coupling means is provided on a coupling shaft, on which toothed belt wheels are mounted. The toothed belts associated with such toothed belt wheels mesh with rotary filter magazines and/or illuminator magazines or at least with toothed belt wheels disposed on a rotary mirror cascade, in order to assign a light emitting unit uniquely to each filter unit. The advantage of such toothed belt wheels is that the engagement of the teeth between the toothed belt wheel and the toothed belt ensures the unique assignment of magazines disposed at intervals relative to each other. The same principle can be applied to slidable magazines if the toothed belts have teeth on both surfaces such that the outer teeth can engage in a gear rack of a slidable magazine while the inner teeth engage with the toothed belt wheels on the coupling shaft.

In addition to a toothed belt drive, it is also possible, to advantage, to employ a mechanical coupling means comprising a gear wheel mounted for rotation on, or together with, a coupling shaft. The toothed rim of this gear wheel can then mesh with gear racks of slidable magazines or with ring gears of rotary magazines or rotary mirror cascades, in order that each filter unit has a uniquely associated light emitting unit.

A sure and reliable assignment of the combinations of filter unit and light emitting unit is also achieved when such a gear wheel is used as a mechanical coupling means. Furthermore, each magazine can be equipped with latching grooves in which corresponding spring-biased latches can snap into place in order to retain the magazine in the operative position of the light emitting units or filter units. The spring-biased latches can be easily released and allowed to snap into place in a corresponding latching groove in the next or some other operative position.

Preference is given to the use of the illuminating device with its different embodiments described above for a fluorescence microscope, wherein the illuminating device can be mounted in the upper portion of the microscope to provide an incident-light arrangement or in the lower portion of the microscope to provide a transmitted-light arrangement.

BRIEF DESCRIPTION OF THE DRAWINGS

Furthermore, it is also possible to switch from a transmitted-light illumination located in the lower portion to an incident-light illumination by deflecting the optical path accordingly.

The invention is explained below in greater detail with reference to the appended figures, in which.

DETAILED DESCRIPTION OF THE INVENTION

Figure 1:
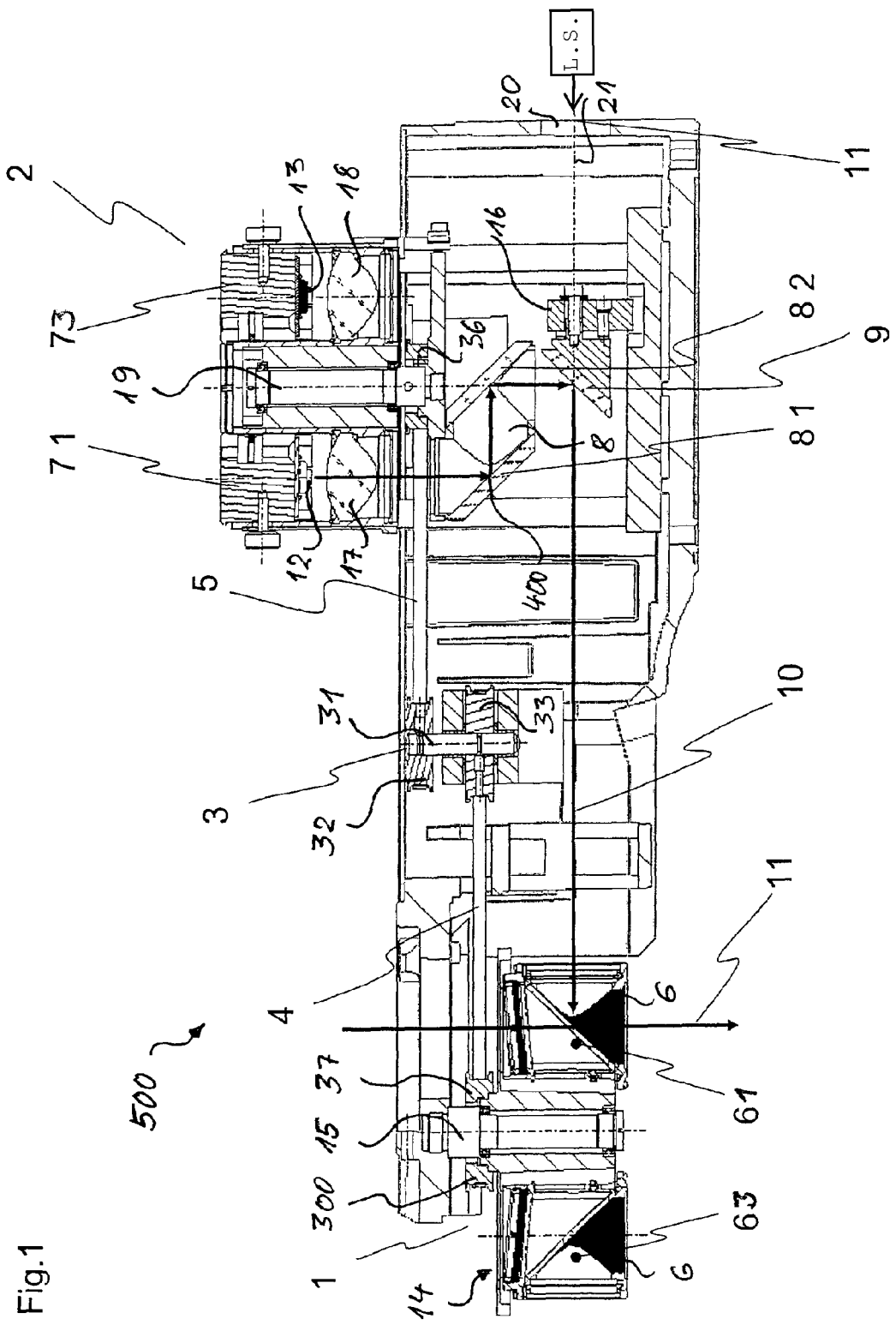
FIG. 1 is a diagrammatic cross section through an illuminating device according to one embodiment of the invention.

FIG. 1 is a diagrammatic cross section through an illuminating device 500 of an embodiment of the invention. This illuminating device 500 can be introduced in a top portion of a microscope into the beam path of the optical axis 11 of the microscope, in order to route the light from a light source in the operative position of a light emitting unit 71 via the optical path 10 to the optical axis 11. This light is additionally filtered by a filter in the operative position of a filter unit 61, for example in order to stimulate fluorescence of an object to be examined.

To this end, in an illuminator magazine 2, the illuminating device 500 has light emitting units 71 and 73, which are equipped with light emitting diodes 12 and 13 in this embodiment of the invention. The light emitting diode 12 constitutes, together with an optics 17, a light emitting unit 71, which can be replaced individually, without changing the magazine, during maintenance or repair work on the microscope. The light emitting unit 73 with the light emitting diode 13 and its associated optics 18 is configured identically. Laser diodes may be used in place of the light emitting diodes 12 and 13. Furthermore, optical fibers or bundles of optical fiber (labeled as OF in FIG. 2) can be used as light sources.

In the embodiment of the invention illustrated in FIG. 1, a circular illuminator magazine 2 is rigidly mounted on a shaft 19 and is non-rotatable. Instead, the illuminator magazine 2 has a rotary mirror cascade 8 with cascade mirrors 81 and 82, which is capable of being rotated below the circular illuminator magazine 2 and, in the position shown in FIG. 1, deflects the light beam of the light emitting diode 12 from the light emitting unit 71 to an optical coupling element 9. The optical coupling element 9 is configured as a mirror, although use may be made of a prism as the optical coupling element 9. The optical coupling element 9 deflects the beam path 10 to the optical axis 11 of the microscope. This optical coupling element 9 can be in the form of switching equipment 16 for the purpose of removing it from the beam path by means of a swiveling, rotating, lowering, or some other movement to allow a different light source (L.S.) and/or a multi-bandpass filter to be included in the filter module 1 via an opening 20 along the dotted line 21. The mechanical coupling between the illuminator magazine 2 and the filter magazine 1 remains unchanged.

The illuminating device 500 shown in FIG. 1 thus has the advantage that other light sources or filters can be included in the beam path 10 once the switching equipment 16 in the form of an optical coupling element 9 has been removed from the beam path 10.

As FIG. 1 shows, with the aid of a filter changer 300, here in the form of a toothed belt wheel 37, it is possible to synchronously couple the light emitting unit 71 currently active in the operative position with its filtered light beam into the optical axis 11 of the microscope. Via the optical axis 11 of the microscope, the object to be examined is thus exposed to light from a first light emitting unit 71 via the mirror cascade 8, via the optical coupling element 9, and via the beam path 10, the light having been filtered by the filter unit 61.

In order to ensure synchronous changing of the combination consisting of the light emitting unit 71 and the filter unit 61 to the combination consisting of the light emitting unit 73 and the filter unit 63, the illuminating device comprises a mechanical coupling means 3 having two toothed belt wheels 32 and 33 on a coupling shaft 31. These toothed belt wheels 32 and 33 are rigidly mounted on the coupling shaft 31. The toothed belt wheel 32 is coupled by a toothed belt 5 with a toothed belt wheel 36 of the mirror cascade 8, and in turn the toothed belt wheel 33 is coupled via the toothed belt 4 with the toothed belt wheel 37 of the filter magazine. Hence it simply suffices for either the mirror cascade 8 or the filter module 1 or the coupling shaft 31 to be turned in order to bring about a corresponding synchronous turning of the filter module 1 or the mirror cascade 8.

Figure 2:
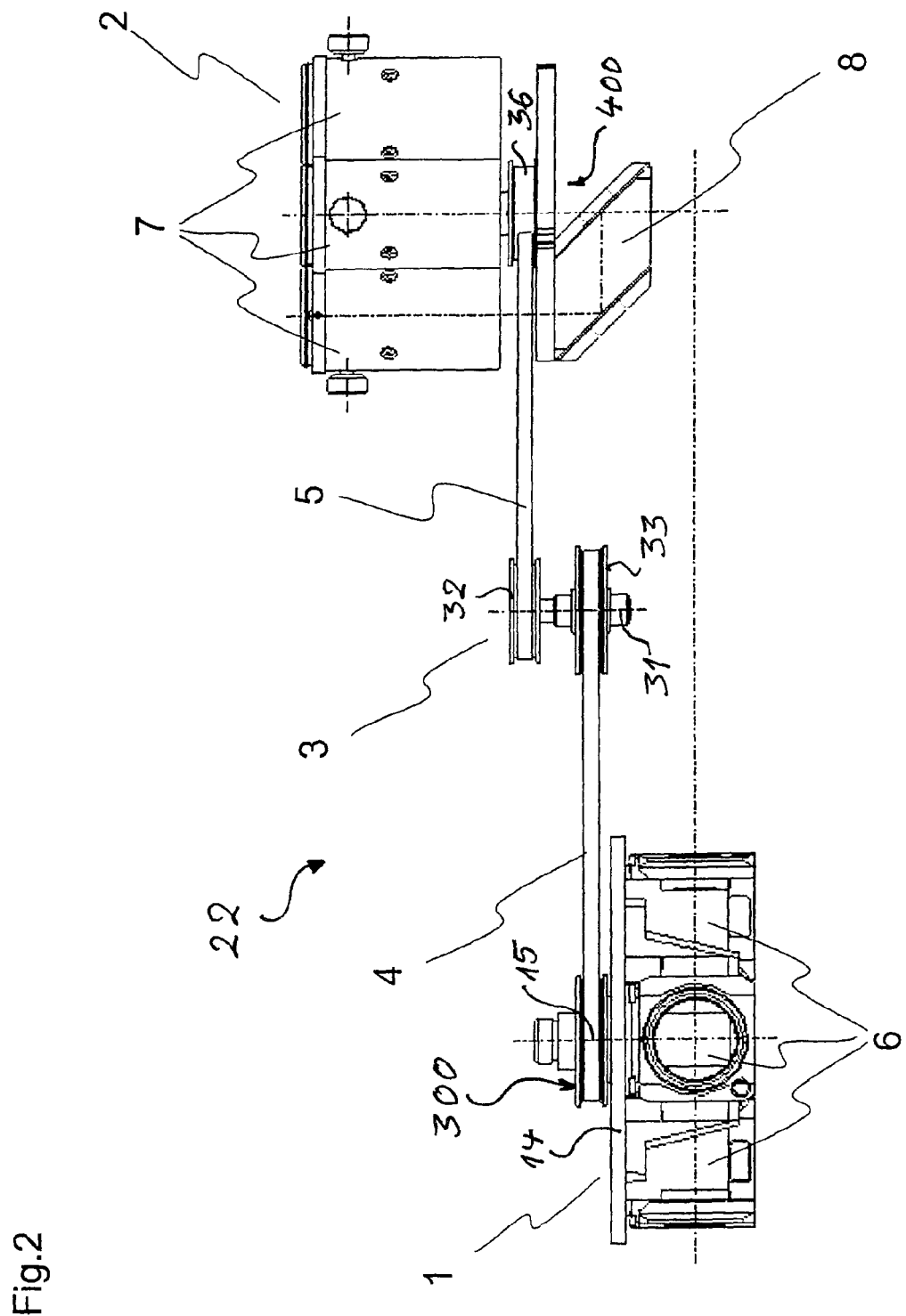
FIG. 2 is a diagrammatic side view of a changing mechanism for a synchronous cooperation of a filter magazine with an illuminator magazine via a coupling means.

FIG. 2 shows a diagrammatic side view of a changing mechanism 22 for the synchronous cooperation of a filter magazine 1 with an illuminator magazine 2 via a coupling means 3. To this end, the immovable illuminator magazine 2 has immovable light emitting units 7 and an illuminator changer 400 in the form of a mirror cascade 8 as described above. This mirror cascade 8 is mounted for rotation and is driven by a toothed belt wheel 36, which cooperates via a toothed belt 5 with a toothed belt wheel 32 of a coupling means 3. By means of its coupling shaft 31, the coupling means 3 transfers the change in position of the mirror cascade 8 to a toothed belt wheel 33, which in turn cooperates with a filter changer 300 in the form of a toothed belt wheel 37 of the filter magazine 1. The filter magazine is configured as a turret magazine 14 and is revolvable about an axis 15. This changing mechanism consisting of toothed belt wheels, toothed belts, and coupling means 3 ensures that a light emitting unit 7 is assigned uniquely to a filter unit 6.

Figure 3:
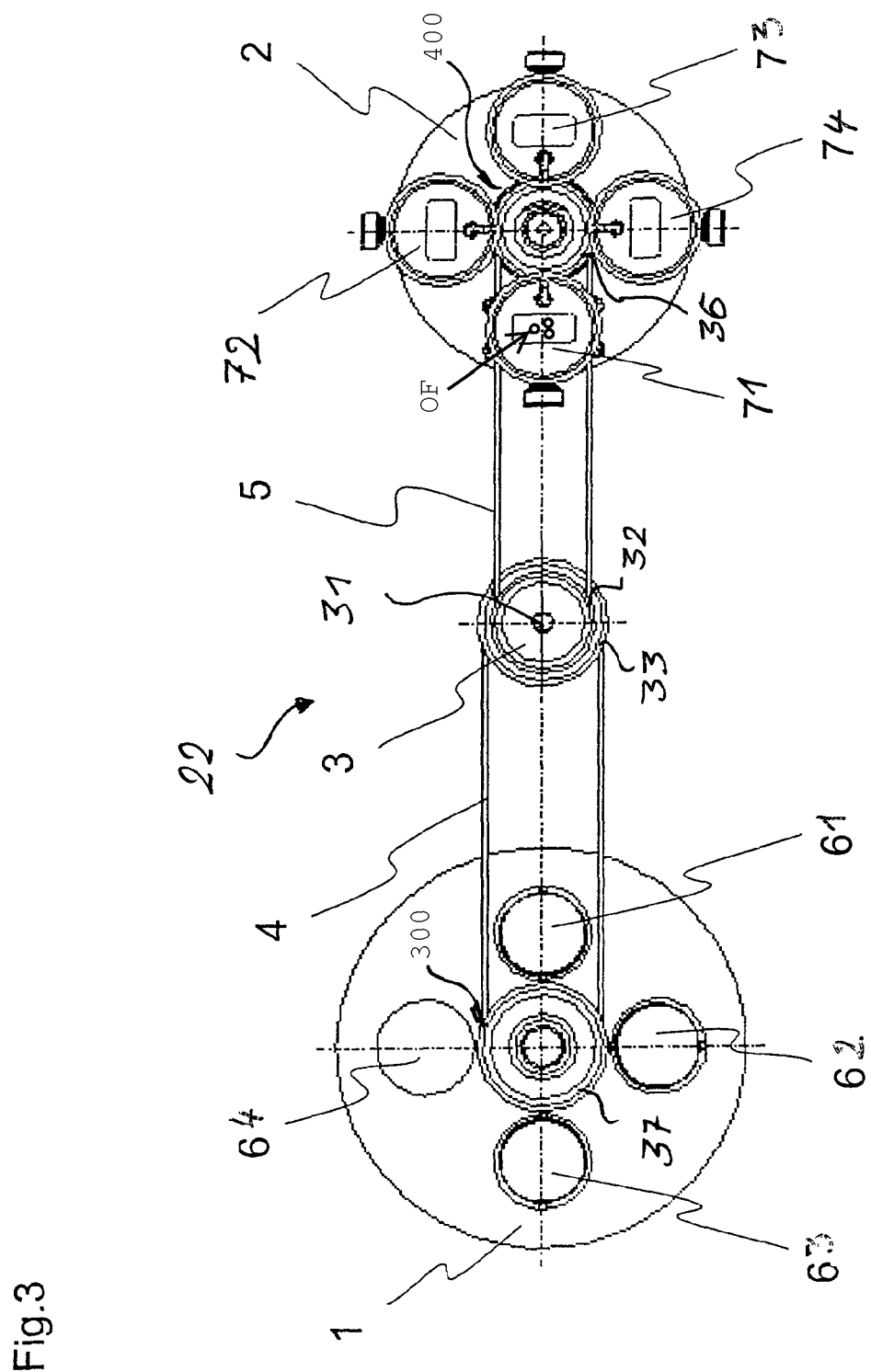
FIG. 3 is a diagrammatic top view of the mechanism shown in FIG. 2.

FIG. 3 is a diagrammatic top view of the mechanism shown in FIG. 2. Components having the same functions as in the previous figures are designated by the same reference numerals and are not discussed further. In this top view, it is shown that four light sources in the form of light emitting units 71, 72, 73, and 74 synchronously cooperate with four corresponding filter units 61, 62, 63, and 64 via the coupling means 3 consisting of belt wheels 32 and 33 and toothed belts 4 and 5 such that, in the situation illustrated, the filter unit 61 is coupled with the light emitting unit 71. As the filter unit 61 rotates, the assigned light source of the illuminator magazine 2 is automatically coupled in via the coupling mechanism 3.

Figure 4:
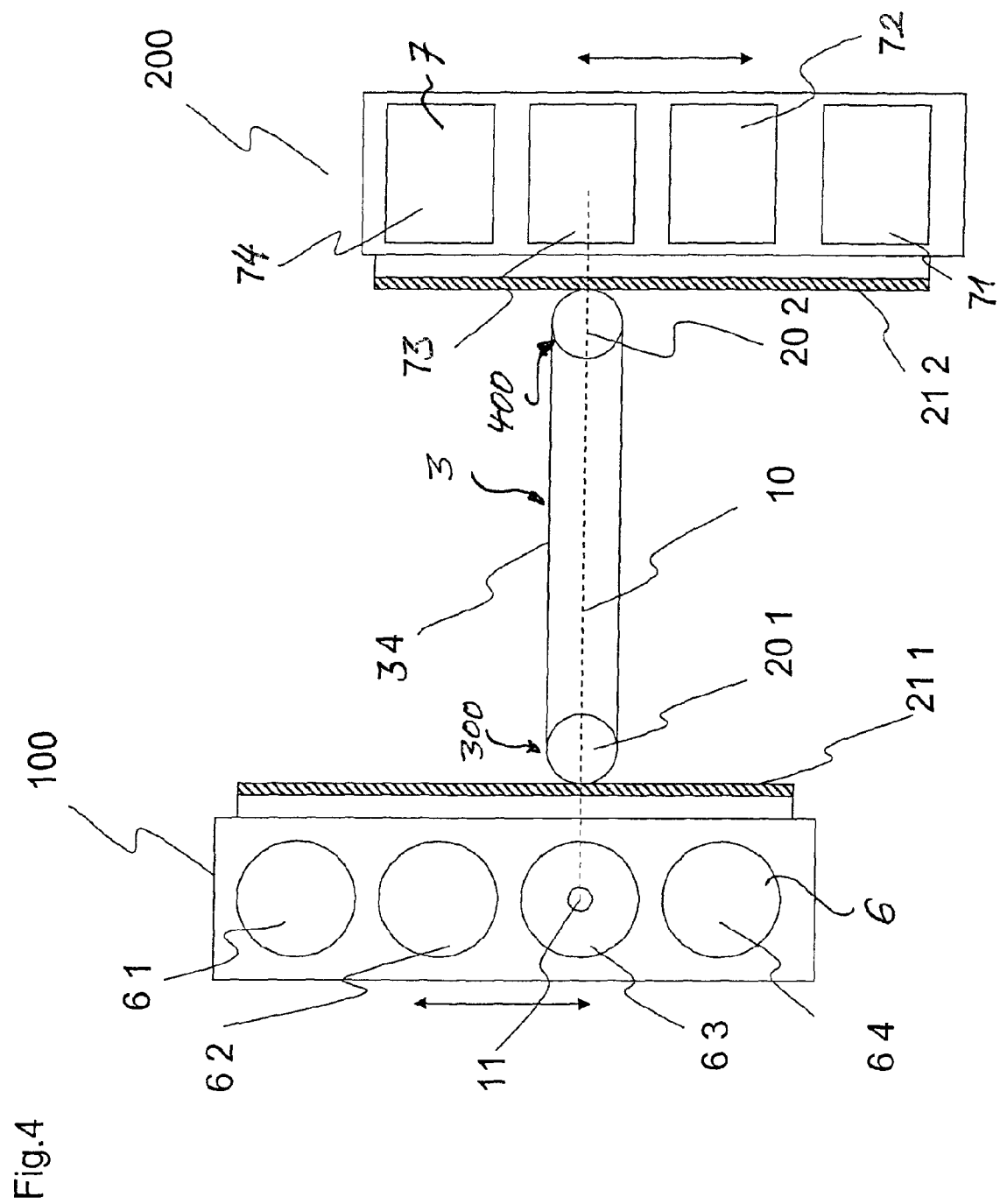
FIG. 4 is a schematic diagram of another embodiment of the invention.

FIG. 4 is a schematic diagram of another embodiment of the invention, wherein components having the same functions have the same reference numerals. This case does not involve filter units or light emitting units arranged in circles, but so-called slidable magazines in which the filter units 61, 62, 63, and 64 and the respective light emitting units 71, 72, 73, and 74 are linearly arranged and are linearly displaceable. In this embodiment of the invention, these linear magazines have gear racks 211 and 212 respectively. Teeth disposed on the outer side of a toothed belt 34 engage the gear racks and mesh with teeth on said gear racks 211 and 212 respectively, which are coupled via the toothed belt wheels 201 and 202 respectively. In this case the coupling means 3 consists of the toothed belt 34, which has teeth disposed on its outside surface. For precise preadjustment, this toothed belt 34 can also have teeth disposed on its inside surface and adapted to mesh with corresponding teeth on the toothed belt wheels 201 and 202 respectively. This configuration ensures that the slidable magazine 100 for the filter units 61 to 64 and the slidable magazine 200 for the light emitting units 71 to 74 are synchronously changed in such a way that the combinations of light emitting units 7 with the assigned filter units 6 can always be moved to a unique operative position relatively to each other.

Figure 5:
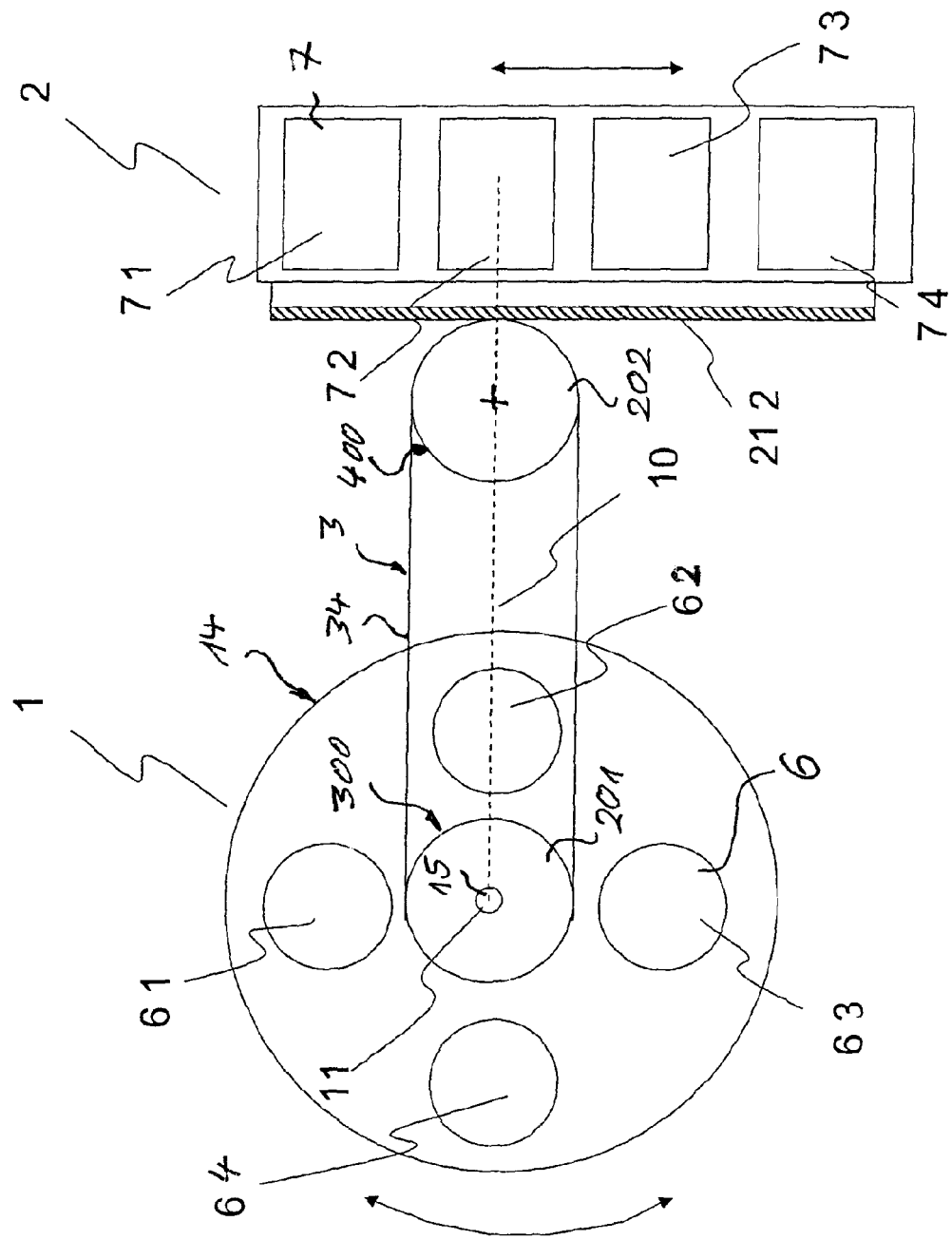
FIG. 5 is a schematic diagram of a further embodiment of the invention.

FIG. 5 is a schematic diagram of another embodiment of the invention, in which components having the same functions as in the previous figures are designated by the same reference numerals and are not discussed further. In this embodiment of the invention, a filter magazine 1 configured as a turret magazine 14 is coupled with a linearly configured illuminator magazine 2, the coupling means again being in the form of a toothed belt 34 engaging two toothed belt wheels 201 and 202 respectively. Thus the toothed belt wheel 201 constitutes the filter changer 300 and cooperates with the filter module 1. The toothed belt wheel 202 together with the toothed belt 34 constitutes the illuminator changer, the teeth disposed on the outside surface of said belt meshing with teeth on the gear rack 212. Here again, a light unit 7 can be fully synchronized uniquely with a specific filter unit 6.

The invention claimed is:
1. An illuminating device for a microscope, comprising:
an illuminator magazine having a plurality of light generating and emitting units, wherein the illuminator magazine is associated with a mechanical illuminator changer for positioning one of the light generating and emitting units in an active position;
a filter magazine having a plurality of filter units, wherein the filter magazine is associated with a mechanical filter changer for positioning one of the filter units in an active position; and
at least one mechanical coupling mechanism, which cooperates with the filter changer and the illuminator changer, for uniquely assigning each filter unit to a specific light emitting and generating unit;

wherein an optical coupling element is disposed in an optical path between the filter magazine and the illuminator magazine, and wherein the optical coupling element deflects a light beam from the illuminator magazine to the filter magazine.

2. The illuminating device as defined in claim 1, wherein at least one of the filter magazine or the illuminator magazine has at least one of linearly disposed units or circularly disposed units.

3. The illuminating device as defined in claim 1, wherein at least one of the filter changer or the illuminator changer comprises a turret magazine.

4. The illuminating device as defined in claim 1, wherein at least one of the filter changer or the illuminator changer comprises a slidable magazine.

5. The illuminating device as defined in claim 1, further comprising a switching mechanism for switching the illuminator magazine to an active or a passive mode.

6. The illuminating device as defined in claim 1, wherein the optical coupling element can be removed from the optical path between the filter magazine and the illuminator magazine.

7. The illuminating device as defined in claim 1, wherein, following a removal of the optical coupling element from the optical path between the filter magazine and the illuminator magazine, another light emitting source can be coupled into the optical path.

8. The illuminating device as defined in claim 1, wherein at least one of the filter changer or the illuminator changer has at least one of a rotatable or a displaceable mirror cascade.

9. The illuminating device as defined in claim 1, wherein the filter magazine has either permanently mounted filter units or exchangeable filter modules.

10. The illuminating device as defined in claim 1, wherein the illuminator magazine has either permanently mounted light emitting units or exchangeable light emitting modules.

11. The illuminating device as defined in claim 1, wherein the light generating and emitting unit comprises at least one light emitting diode or at least one laser diode.

12. The illuminating device as defined in claim 1, wherein the light generating and emitting unit comprises at least one optical fiber.

13. The illuminating device as defined in claim 1, wherein the light generating and emitting unit comprises a bundle of optical fibers.

14. The illuminating device as defined in claim 1, wherein the mechanical coupling mechanism comprises toothed belt wheels mounted on a coupling shaft, and wherein a toothed belt meshes with the mechanical coupling mechanism and a belt wheel disposed on either at least one of the rotatable filter magazine or the illuminator magazine or at least one rotatable mirror cascade in order that each filter unit is uniquely associated with a light generating and emitting unit.

15. The illuminating device as defined in claim 1, wherein the mechanical coupling mechanism comprises a rotatable gearwheel mounted for rotation, and wherein a gear ring of the rotatable gearwheel meshes with one of a toothed rack of a displaceable magazine, a toothed rim of a rotatable magazine, or toothed rims of rotatable magazines and rotatable mirror cascades in order that each filter unit is uniquely associated with a light generating and emitting unit.

16. The illuminating device as defined in claim 1, wherein the mechanical coupling mechanism has a rotatable gearwheel mounted for rotation with a coupling shaft, and wherein a gear ring of the rotatable gearwheel meshes with one of toothed racks and displaceable magazines or toothed rims of rotatable magazines and rotatable mirror cascades in order that each filter unit is uniquely associated with a light generating and emitting unit.

17. The illuminating device as defined in claim 1, wherein the mechanical coupling mechanism has toothed belt wheels which mesh with toothed belts, wherein the toothed belts have teeth on both sides for meshing with toothed racks on at least one of magazines or mirror stages so as to associate each filter unit uniquely with a light generating and emitting unit.

18. A fluorescence microscope comprising an illuminating device as defined in claim 1.

19. The fluorescence microscope as defined in claim 18, wherein the illuminating device provides incident-light.

20. The fluorescence microscope as defined in claim 18, wherein the illuminating device provides transmitted-light.

* * * * *